(12) United States Patent
DeWhitt et al.

(10) Patent No.: US 7,082,495 B2
(45) Date of Patent: Jul. 25, 2006

(54) METHOD AND APPARATUS TO REDUCE POWER CONSUMPTION AND IMPROVE READ/WRITE PERFORMANCE OF HARD DISK DRIVES USING NON-VOLATILE MEMORY

(75) Inventors: Dean L. DeWhitt, Sammamish, WA (US); Clark D. Nicholson, Seattle, WA (US); W. Jeff Westerinen, Sammamish, WA (US); Michael R. Fortin, Redmond, WA (US); John M. Parchem, Seattle, WA (US); Charles P. Thacker, Palo Alto, CA (US)

(73) Assignee: Microsoft Corporation, Redmond, WA (US)

( * ) Notice: Subject to any disclaimer, the term of this patent is extended or adjusted under 35 U.S.C. 154(b) by 431 days.

(21) Appl. No.: 10/372,734

(22) Filed: Feb. 21, 2003

(65) Prior Publication Data

US 2004/0064647 A1    Apr. 1, 2004

Related U.S. Application Data

(63) Continuation-in-part of application No. 10/186,164, filed on Jun. 27, 2002.

(51) Int. Cl.
*G06F 12/00* (2006.01)
(52) U.S. Cl. ........................ 711/113; 711/135
(58) Field of Classification Search ................ 711/113, 711/135
See application file for complete search history.

(56) References Cited

U.S. PATENT DOCUMENTS

| 5,307,497 | A | 4/1994 | Feigenbaum et al. |
| 6,073,232 | A | 6/2000 | Kroeker et al. |
| 6,101,601 | A | 8/2000 | Matthews et al. |
| 6,209,088 | B1 | 3/2001 | Reneris |
| 6,321,234 | B1 * | 11/2001 | Debrunner .................. 707/202 |
| 2003/0177305 | A1 * | 9/2003 | Hetrick ........................ 711/113 |
| 2004/0093463 | A1 * | 5/2004 | Shang .......................... 711/113 |

OTHER PUBLICATIONS

Mendel Rosenblum and John K. Ousterhout, The Design and Implementation of a Log-Structured File System, Proceedings of the Thirteenth ACM Symposium on Operating Systems Principles; ACM Press, New York, NY, pp. 1-15; ISBN: 0-89791-447-3.

* cited by examiner

*Primary Examiner*—Jack A. Lane
(74) *Attorney, Agent, or Firm*—Marshall, Gerstein & Borun LLP

(57) ABSTRACT

A method and apparatus to improve the read/write performance of a hard drive is presented. The hard drive includes solid state, non-volatile (NV) memory as a read/write cache. Data specified by the operating system is stored in the NV memory. The operating system provides a list of data to be put in NV memory. The data includes data to be pinned in NV memory and data that is dynamic. Pinned data persists in NV memory until the operating system commands it to be flushed. Dynamic data can be flushed by the hard drive controller. Data sent by an application for storage is temporary stored in NV memory in data blocks until the operating system commits it to the disk.

54 Claims, 11 Drawing Sheets

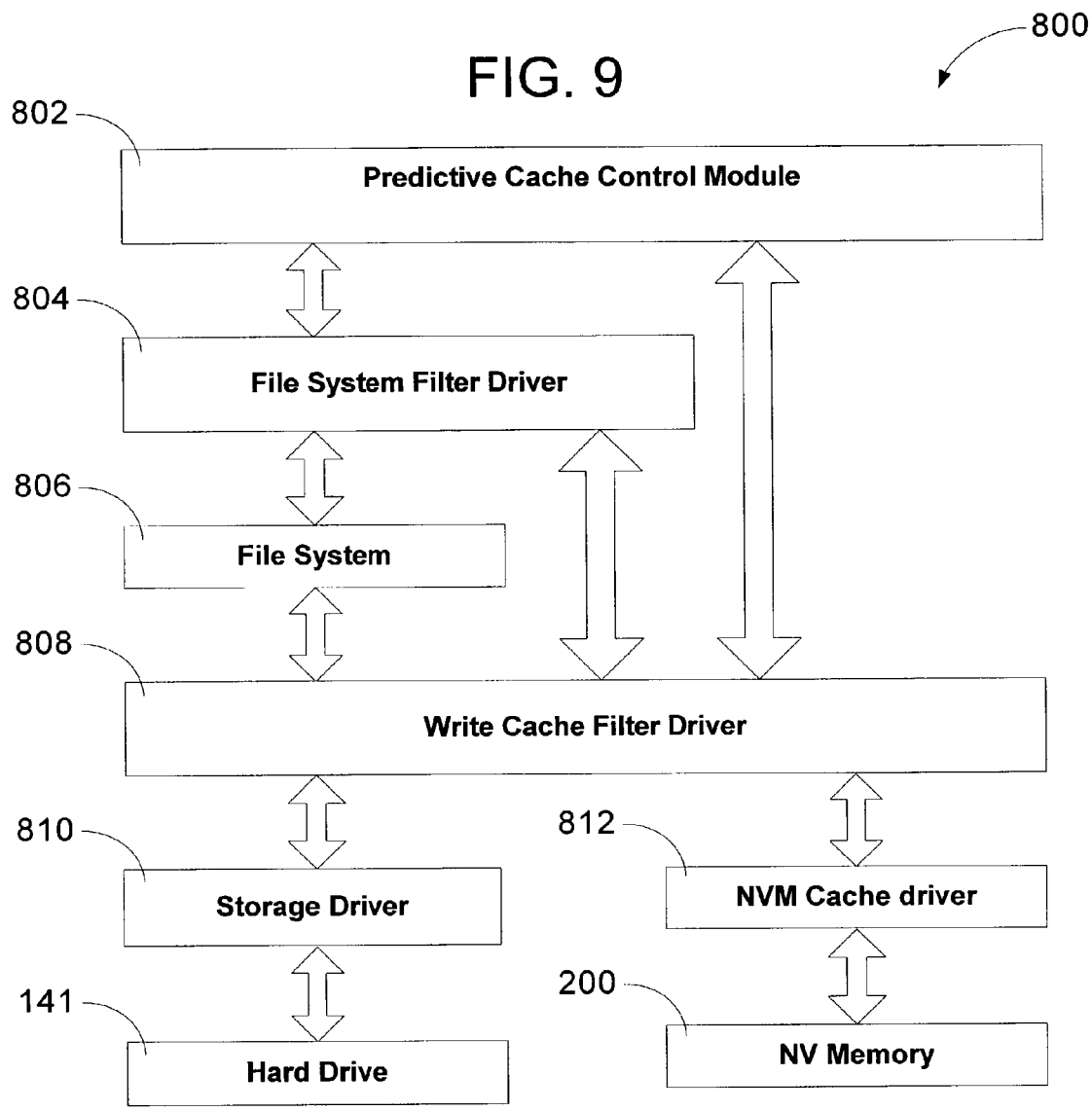

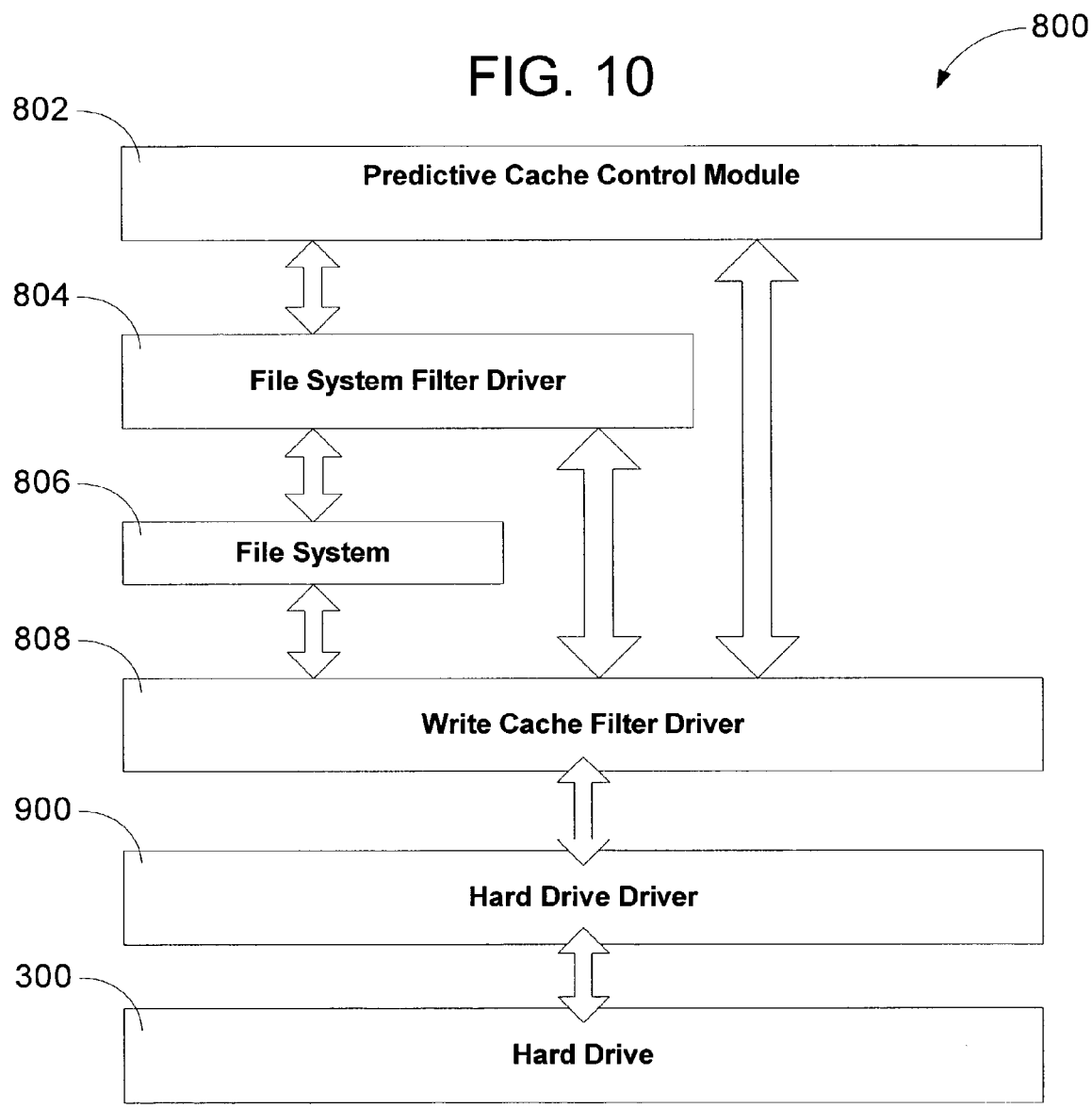

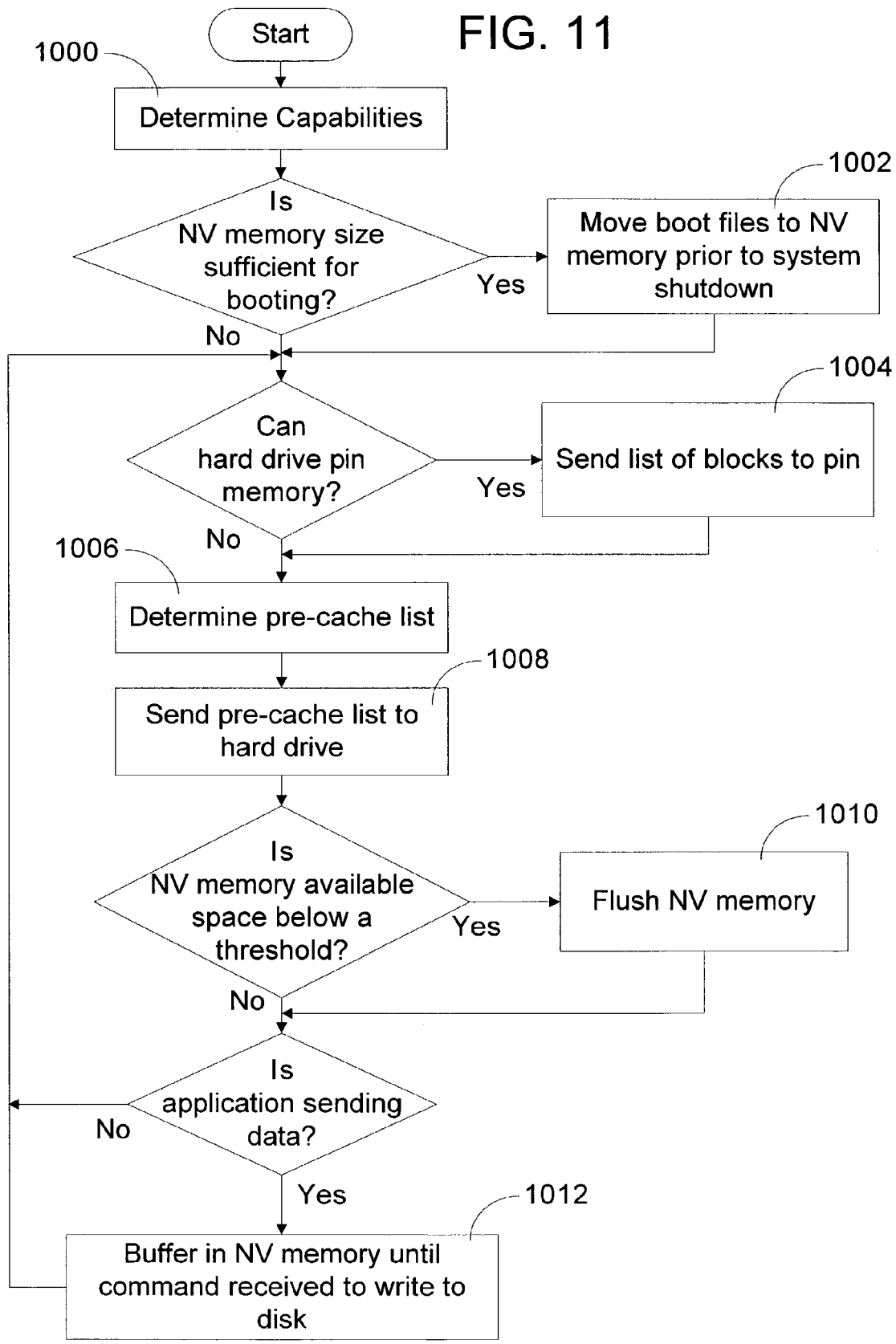

METHOD AND APPARATUS TO REDUCE POWER CONSUMPTION AND IMPROVE READ/WRITE PERFORMANCE OF HARD DISK DRIVES USING NON-VOLATILE MEMORY

CROSS-REFERENCE TO RELATED PATENT APPLICATIONS

This patent application is a continuation-in-part of co-pending U.S. patent application Ser. No. 10/186,164, filed Jun. 27, 2002.

FIELD OF THE INVENTION

This invention relates generally to computer systems and, more particularly, relates to improving the performance of hard disk drives.

BACKGROUND OF THE INVENTION

Computers such as conventional personal computers often utilize a time-consuming initialization process in order to load and initiate the computer operating system, programs and data. The operating system, executables, and data are typically stored on a rotating non-volatile media such as a magnetic hard disk (e.g., a hard drive). However, the computer's microprocessor executes instructions only from addressable memory such as DRAM or some other type of volatile electronic memory. In order to initialize this addressable memory to boot the operating system, a small amount of non-volatile boot-up memory is typically provided in an EPROM (electronically programmable read-only memory) or similar device. When the computer is booted, a boot program stored in the non-volatile memory is used. The boot program contains code for reading an initial portion of the operating system on the hard disk that is responsible for loading and initializing the remaining portions of the operating system.

The transfer of the operating system, executables, and data from the hard drive is slow, particularly when the operating system is a large operating system, a file is large, etc. This is prevalent not only in booting the computer system, but also in restoring the computer system from hibernate mode. A significant factor in the transfer time is due to the disk drive spin up speed. A relatively small disk spinning at a relatively slow RPM requires 5 to 6 seconds to spin up and be usable. Larger disks such as multi-platter devices and those spinning at faster RPMs require 10 to 12 seconds or more to spin up. On server systems having hundreds or thousands of disk drives that spin up in a largely sequential manner, the disk spin up time can be over ninety percent of the total time to boot the server system. The hard drive consumes a significant share of the power used by a computer system, contributes substantially to thermal load, and causes the PC to be noisy due to the fan noise needed to cool the system.

Methods have been developed for increasing the speed in booting the computer system and restoring the computer system from hibernation. One example is disclosed in to Feigenbaum et al U.S. Pat. No. 5,307,497. The '497 patent teaches that a portion of an operating system can be stored in read-only memory (ROM) for fast access of the portion during power-on or reset. However, the portion stored in ROM can not be changed. In other words, the method disclosed in the '497 patent does not adapt to changing user preferences regarding operating system settings and applications used, to restoring the computer system from hibernation, or to updated or new versions of an operating system.

Another example developed by industry is storing the state of the computer memory to a backup memory that is separate from the disk drive and stores the entire computer memory. This backup memory is large because it stores the entire computer memory.

BRIEF SUMMARY OF THE INVENTION

The present invention improves the read/write performance of a hard drive and reduces the number of times the hard drive disk is accessed. The operating system provides a list of data to be put in solid state, non-volatile ("NV") memory. The data includes data to be pinned in NV memory and data that is dynamic. Pinned data persists in NV memory until the operating system commands it to be flushed. Dynamic data is data that can be prioritized by the operating system but are otherwise controllable by the hard drive controller.

The NV memory is used during system operation to buffer temporary files. When available resources on the NV memory falls below a threshold, the data stored in the NV memory is transferred to the disk drive. This reduces the number of times the disk drive is spun up when the system is operating.

An interface for enabling an operating system to control a NV memory cache in a hard drive is also provided. The interface comprises commands for the operating system and hard drive to communicate. The interface includes a command to determine capabilities of the hard drive; a command to pin a list of blocks in the NV memory; a command to pre-cache a list of blocks in the NV memory, a command to flush commands from the NV memory to a hard drive disk, a command to write a set of blocks that comprise a write transaction to NV memory and a command to commit the write transaction to the hard drive disk.

During operation, the operating system predicts what data a user will need based upon usage scenarios and provides a list of blocks of data for the hard drive pre-cache so that the user doesn't have to wait for the hard disk to be accessed. Some data may be needed frequently or needed for booting. The NV memory has an array of cached memory blocks with the ability to pin individual blocks. A pinned block is held in the cache until the operating system unpins it. The memory may be pinned in such a way that it persists in NV memory between boots of the computer system. The operating system determines what data should be permanently stored in NV memory and sends a list of blocks to the hard drive. The hard drive pins those blocks in NV memory until the operating system releases the blocks.

Additional features and advantages of the invention will be made apparent from the following detailed description of illustrative embodiments which proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

FIG. 9 is a block diagram illustrating a storage network stack in accordance with the present invention;

FIG. 10 is a block diagram illustrating an alternate storage network stack in accordance with the present invention; and FIG. 11 is a flow chart illustrating a process for storing data in NV memory in accordance with the teachings of the present invention.

DETAILED DESCRIPTION OF THE INVENTION

Figure 1:
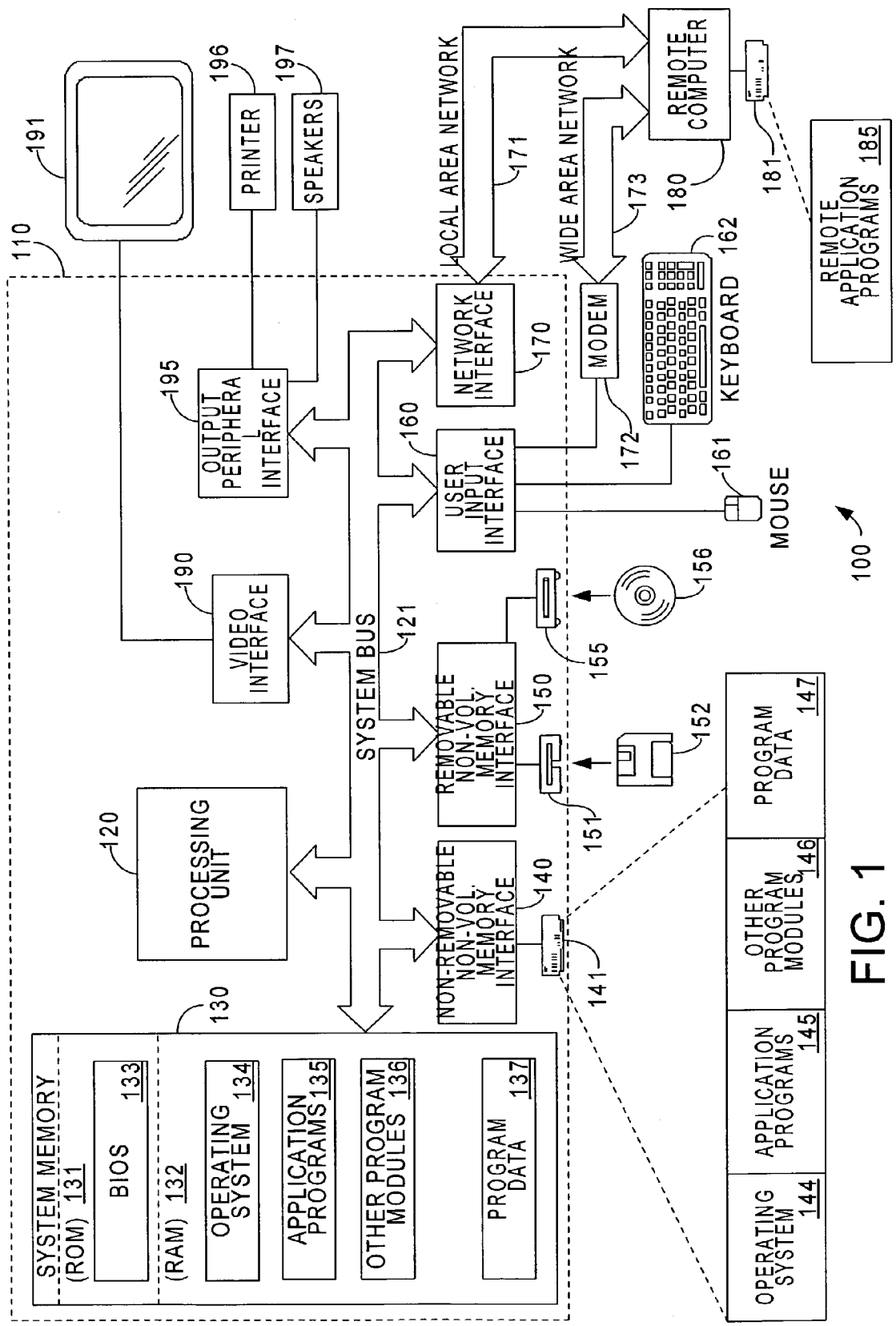
FIG. 1 is a block diagram generally illustrating an exemplary computer system on which the present invention resides.

The present invention reduces power consumption of hard disk drives and improves the read/write performance of hard disk drives, decreases the boot time and the hibernate awaken time of a computer system. Static and dynamic configuration data are stored in solid state, nonvolatile memory technology such as flash memory. Static configuration data is the operating system and application program instructions and data that do not change each time the operating system boots or an application launches except after upgrades to the operating system have been installed or applications have been installed. Dynamic configuration data is program instructions and data that changes with each boot of the operating system or each launch of an application and may change at any time during execution. In the description that follows, the term "NV memory" will be used to refer to solid state non-volatile memory. NV memory means any type of memory that retains its data when power is removed and that can be erased and reprogrammed with new data. The NV memory may include battery-backed up memory. The NV memory may be located in a computer as a separate component of the computer such as a pc slot card or as a component in system memory. Alternatively, it could be a component of a persistent storage device such as a hard drive, in a docking station of a notebook device and the like. On mobile systems, the track buffer memory the disk drives have can be used (i.e., the invention can also be implemented using the track buffer memory). Future disks for mobile systems may draw from battery power to keep its memory alive without actually drawing power to keep the disk spinning. The NV memory contains data at a file level and as known disk sectors such as the boot sector and partition tables. During power down or entry into a hibernate mode, the computer system determines the static and dynamic configuration data to be stored in NV memory based on a history of prior uses. Data is also stored in the NV memory during system operation to reduce the number of times the disk drive is spun up. For mobile PCs and the like, reducing the number of times the disk drive is spun up improves user experience because power is reduced, thereby allowing smaller and lighter mobile PCs and the like that last longer on a given battery capacity. It also reduces the need to run noisy, high speed fans that are loud and annoying to the user. When the computer system is powered up or awakened from hibernation, the configuration data in NV memory is used to initialize the dynamic system memory without requiring the disk drive to spin up. In cases where additional files are required from the disk, the disk drive can be spun up simultaneously to the initialization from NV memory so that the disk spin up does not slow down the initialization process.

Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Associate (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers hereto illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be another personal computer, a server, a router, a network PC, a peer device or other common network node, and typically includes many or all of the elements described above relative to the personal computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the personal computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the personal computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

In the description that follows, the invention will be described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operation described hereinafter may also be implemented in hardware.

Figure 2:
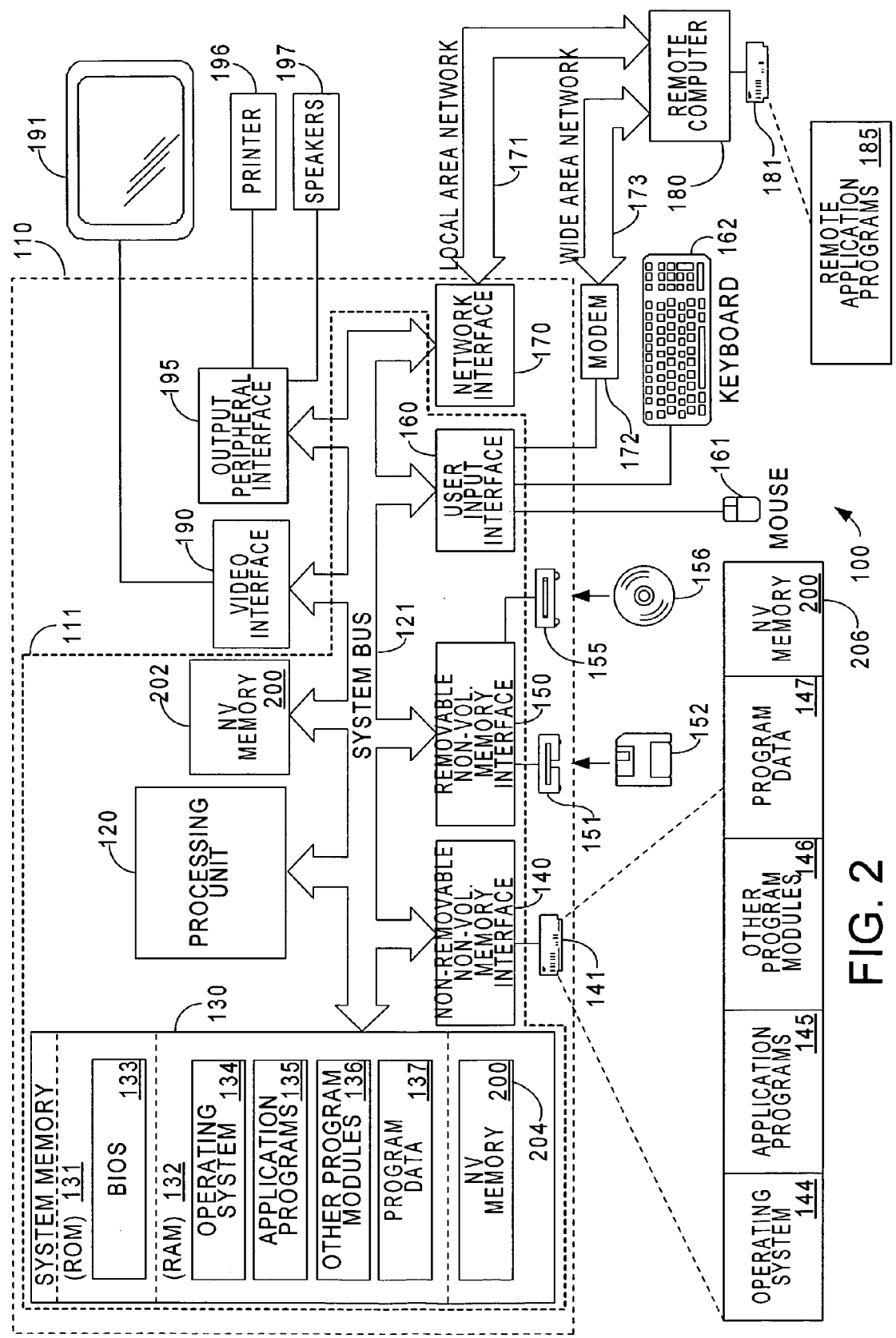
FIG. 2 is a block diagram of the exemplary computer system of FIG. 1 generally illustrating locations where the present invention may be implemented.

Turning now to FIG. 2, the NV memory 200 may be located in the computer 110 as a separate component 202 of the computer 110 such as a card to be put in a pc slot or as a component 204 in system memory. Alternatively, it could be a component 206 of a persistent storage device 300 such as a hard drive 141, in a docking station of a notebook device and the like. The NV memory 200 as a separate component 202 provides the capability to improve performance on legacy systems that do not have NV memory 200 without having to install a hard drive having NV memory.

Figure 3:
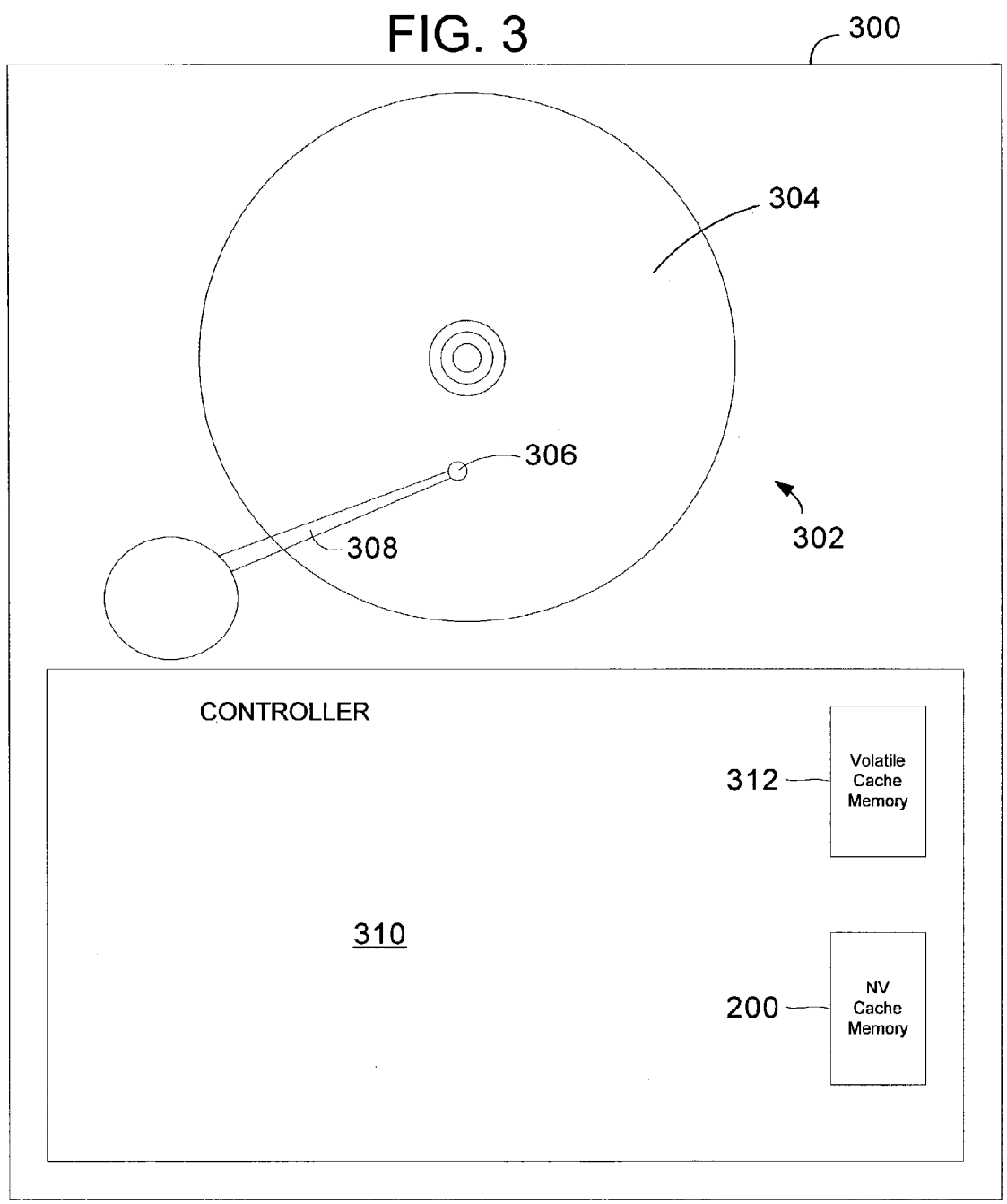
FIG. 3 is a top view illustrating a disk drive embodying the invention.

Turning now to FIG. 3, the persistent storage device 300 has a disk assembly 302 that includes a non-volatile memory storage medium such as one or more disks 304, a read/write head 306 for reading and writing to the disk 304, and a spindle/armature assembly 308 for moving the read/write head 304 to locations on the disk 304. The controller 310 commands the disk assembly to read data from the storage medium or write data to the storage medium. A cache memory 312 is used to buffer data being read from or written to the storage medium. The NV memory 200 of the present invention is located within the controller 310 or as a separate component of the persistent storage device 300. In one embodiment, the NV memory 200 is exposed to the computer 110 to appear as a sector of the disk 304. No change to the IDE (Integrated Drive Electronics) or SCSI (Small Computer System Interface) specifications is required. The computer 110 can detect the presence of NV memory by observing access times of 500 microseconds or less for large regions of the disk 304 instead of the typical times of approximately 10 milliseconds. In an alternate embodiment, the NV memory 200 is exposed to the operating system so that the operating system and other components can query the size of the NV memory 200, control the state of the NV memory 200, write data to the NV memory 200 using a transactional procedure, and as stated above, use the NV memory 200 as a write buffer.

Figure 4:
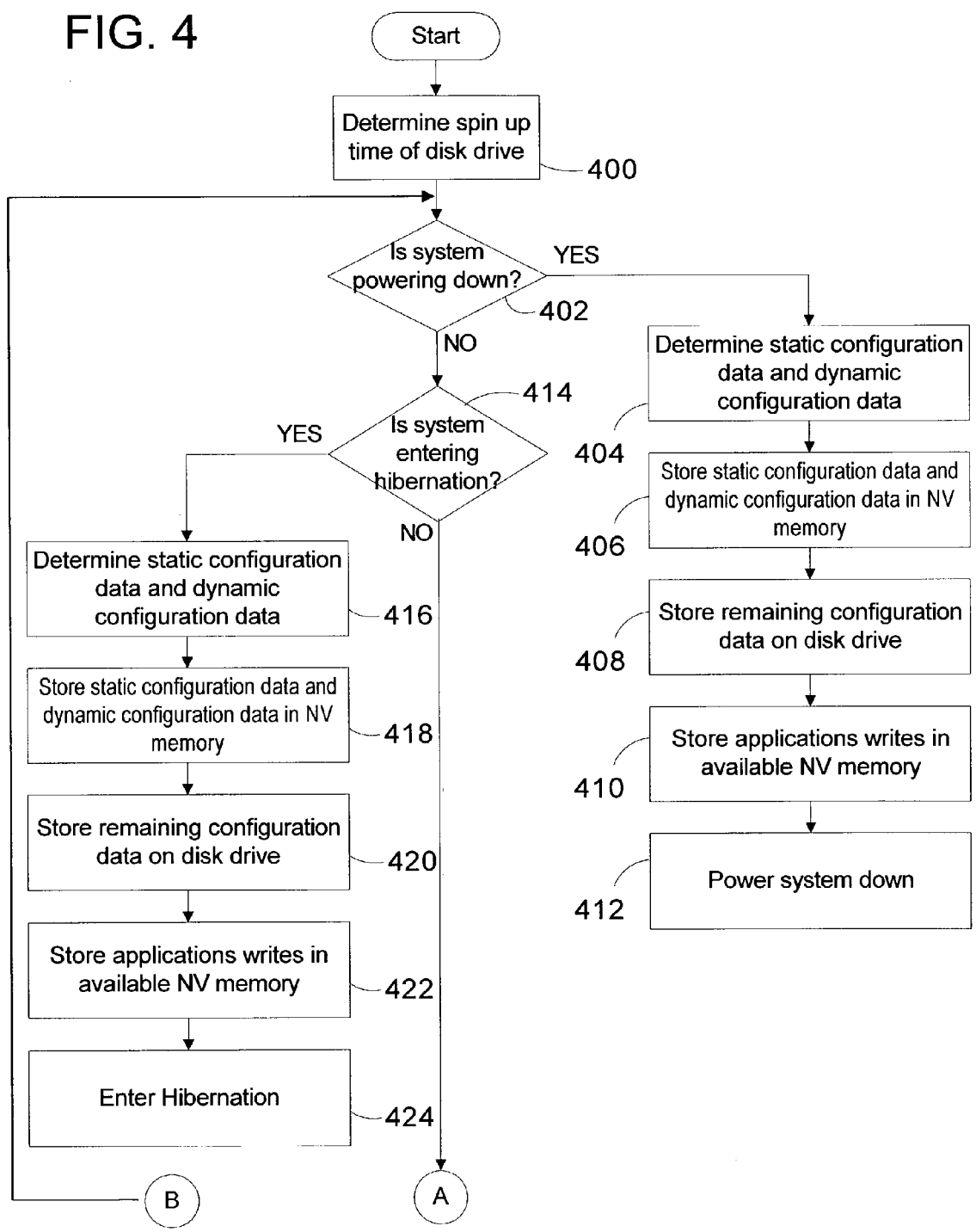
FIG. 4 is a flow chart illustrating a first portion of a process for storing static and dynamic configuration data during power-down or entering into a hibernate mode in order to decrease a boot time and awaken time of a computer system.
Figure 5:
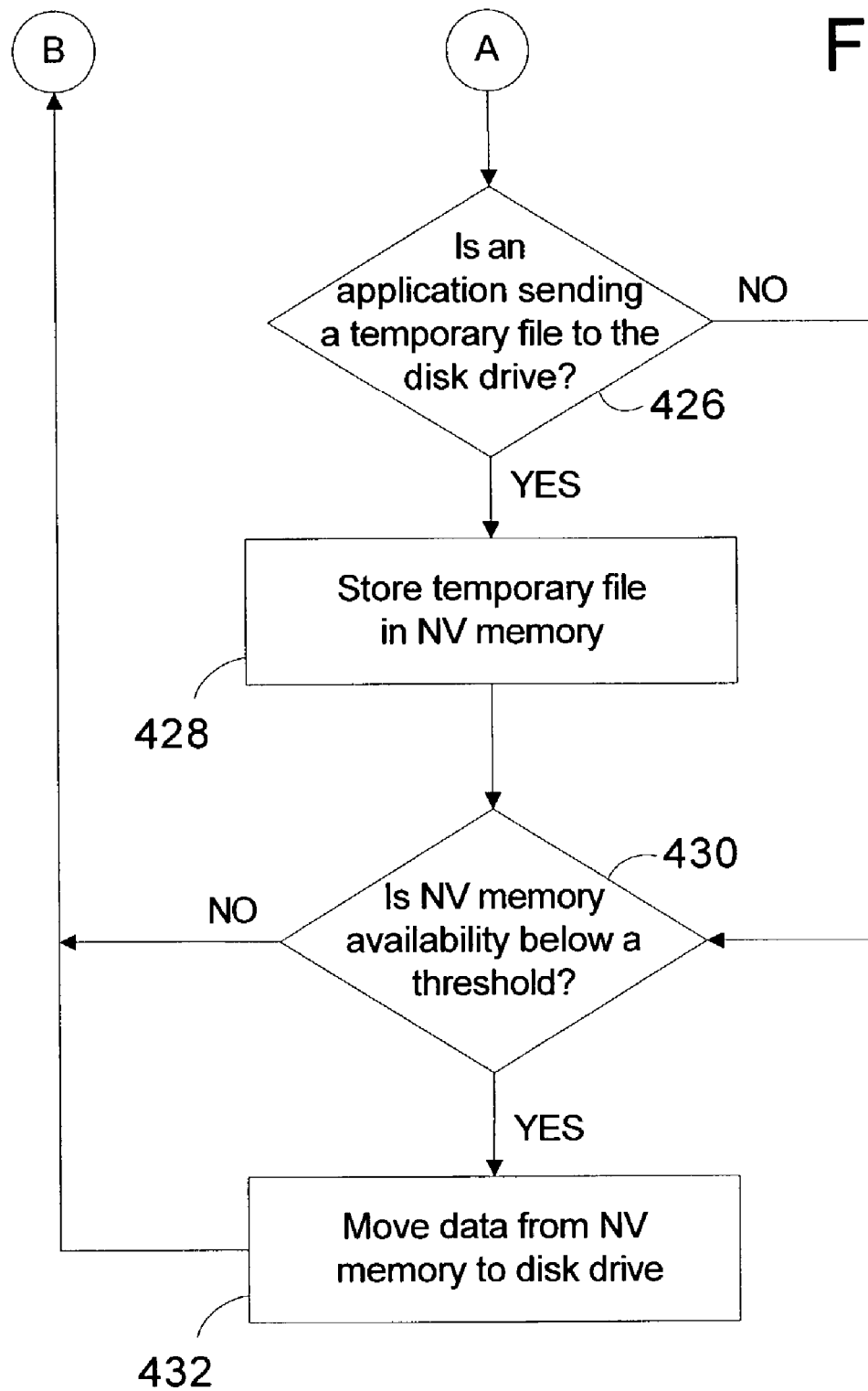
FIG. 5 is a flow chart illustrating a remaining portion of the process for storing static and dynamic configuration data during power-down or entering into a hibernate mode in order to decrease a boot time and awaken time of a computer system.

Operation of the present invention will now be described with reference to FIGS. 4 to 6. It should be noted that the steps described below can be performed sequentially, in parallel, or a combination of sequential and parallel. The spin-up time of the disk 304 is determined (step 400). For relatively small disks spinning at relatively slow speeds, the spin-up time is typically 5 to 6 seconds. For larger disks, multi-platter disks, and disks spinning at faster speeds, the spin-up time approaches 10 to 12 seconds. In one embodiment, the spin-up time is inferred by determining the time it takes to load a page into system memory from the disk drive that is not spinning (i.e., not being accessed). The spin-up time is approximately equal to the load time because the load time is dominated by the spin-up time.

When the computer system is to be powered down (step 402), the static configuration data and dynamic configuration data to be stored in NV memory is determined (step 404). The static configuration data and dynamic configuration data is selected so that the time of initializing the static configuration data and dynamic configuration data is approximately equal to the spin-up time of the disk drive. The static and dynamic configuration data is configuration data that does not need data from the disk drive to be initialized. It may include configuration data for keyboard devices, pointing devices, the USB subsystem, the video subsystem, and the like. The size of the NV memory required is equal to the size of the static configuration data and dynamic configuration data. In many operating systems, the size of the NV memory needed ranges from 16 MB to 64 MB. 128 MB of NV memory may be needed to reduce the cost of CPU compression in some operating systems.

The static configuration data is system configuration data that is used for all users. For example, in the Windows™ operating system, the static configuration data includes boot strapping code to load the static and dynamic configuration data stored on NV memory and the configuration data stored on the disk drive. Other static configuration data in the Windows™ operating system includes files necessary to initialize the kernel such as registry initialization (smss.exe), video initialization (csrss.exe), the shell, services that run from dynamic link libraries (svchost.exe), security services (lsass.exe) such as IPSec and network login. For a computer system that is powering down, the static configuration data that is stored in NV memory includes the boot strapping code, kernel initialization files, the video initialization files, the shell, and services (e.g., dynamic link libraries) that are needed while the disk drive is spinning up.

The dynamic configuration data is system configuration data that is on a per-user basis. For example, dynamic configuration data includes desktop settings (e.g., background image, icon location, etc.), security credentials, internet favorite files, fonts, start-up programs, keyboard settings, personal data files such as scheduled tasks, financial information, and the like. For a computer system that is powering down, the dynamic configuration data that is stored in NV memory includes the desktop settings, keyboard settings, and security credentials The selected static configuration data and dynamic configuration data is stored in the NV memory 200 (step 406). The remaining configuration data is stored on the disk drive (step 408). In one embodiment, the amount of NV memory is larger that the minimum size required. Power down of the system is decreased by storing data that is being sent to the disk for storage that the operating system can not control such as an application writing to the disk to the NV memory 200 for storage (step 410). This reduces the number of writes to the disk, which results in a faster power down time. The computer system is then powered down.

If the system is going into hibernation (step 414), similar steps occur. Static configuration data and dynamic configuration data to be stored in NV memory is determined (step 416) and stored in memory (step 418). This data is the data that is necessary to "repaint" (i.e., restore) the graphical user interface quickly. The static configuration data includes kernel initialization files, the video initialization files, the shell and services that run from dynamic link libraries that were in use prior to hibernation. The dynamic configuration data includes desktop settings, keyboard settings, fonts and the personal data files that were being used prior to hibernation.

The remaining configuration data is stored on the disk drive (step 420). Writes received from applications are stored in available NV memory first and stored on the disk drive if the NV memory is not available (step 422). The computer system then enters hibernate mode (step 424).

In one embodiment, the NV memory is used during system operation. If an application or the operating system is sending data to the disk for storage (step 426), the data is stored in the NV memory 200 (step 428). When the system is being powered down or entering hibernation, the data stored in NV memory 200 is transferred to the disk drive. If the NV memory available space falls below a threshold (step 430), the data in the NV memory is transferred to the disk drive (step 432). One reason for transferring data to the disk drive is to make room for configuration data that is required to resume operation from hibernate or to boot the system. Storing the data in NV memory decreases the number of times the disk drive is spun-up during operation. This improves a user's experience with computing devices, and pocket sized devices in particular, because power consumption is reduced, which subsequently reduces the requirement for a noisy high speed fan. Additionally, the noise of the disk drive spinning and writing data to disk is not heard as often.

Figure 6:
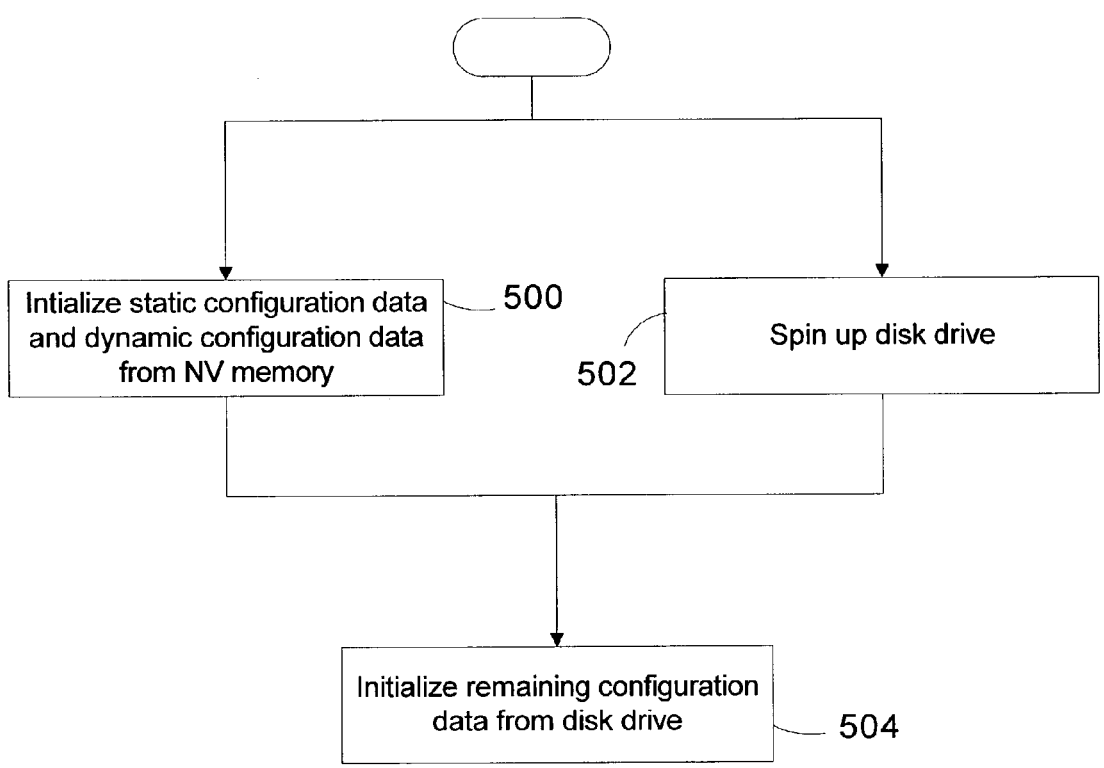
FIG. 6 is a flow chart illustrating a process for decreasing a boot time of a computer system and an awaken time from hibernation of a computer system.

FIG. 6 illustrates the steps taken to boot the computer system or restore the computer system from hibernate mode. When the computer system boots from the disk drive or wakes from the hibernate mode, the computer system initializes the system DRAM by loading it with the static configuration data and dynamic configuration data stored in the NV memory 200 (step 500). If all required initialization data is not stored in NV Memory and additional information must be loaded from the disk, configuration data is first loaded from NV memory and during that time, the disk drive is spinning up (step 502). This effectively eliminates the spin-up time of the disk drive from the boot time and the wake time. Once the disk drive has spun up, the remaining configuration data that is stored on the disk drive is loaded to initialize the system DRAM (step 504). The experience the user sees is that when the user hits the power button, she should see a responsive interactive logon screen by the time of or shortly after the time that the monitor 191 or other type of display device turns on instead of having to wait for the disk drive to spin up. During the time the user clicks on her user icon and types in her password, the services needed to display the desktop are initialized. A responsive and usable desktop is shown to the user after the disk spins up and the data in the NV is verified to be consistent with the data on the disk drive. In one embodiment, all of the cached data is not compared. However, if there are mismatches within the partition or file system metadata, the computer system needs to bug-check and enter a service/help mode such that a slow boot can be attempted at next boot. A help button or switch can be used to bypass the NV memory and turn on the computer system in safe mode for recovery and backward compatibility purposes.

Figure 7:
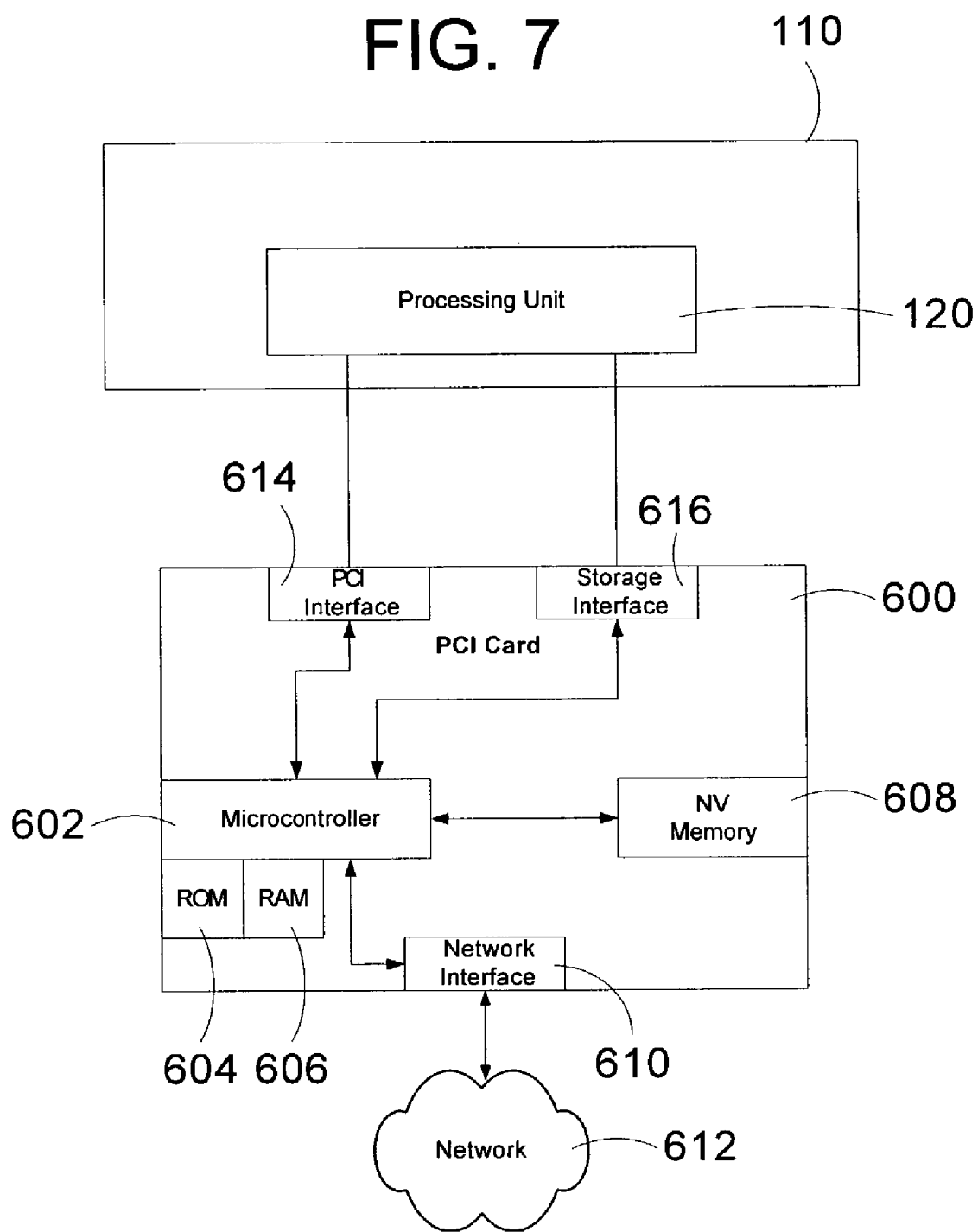
FIG. 7 is a block diagram illustrating an implementation of an alternate embodiment of the invention using a hardware card.

In an alternate embodiment, the NV memory 200 is exposed to the operating system so that the operating system and other components can query the size of the NV memory 200, control the state of the NV memory 200, write data to the NV memory 200 using a transactional procedure, and use the NV memory 200 as a write buffer. This embodiment may be implemented in a variety of ways. The NV memory may be located in the hard disk drive 300 as illustrated in FIG. 3. If data is cached in NV memory and is also on the disk, the processor 602 uses the data cached in NV memory 608 instead of data from the disk. FIG. 7 illustrates where the NV memory is in a network adapter card hardware for systems that do not have hard drives with NV memory. This embodiment can be implemented on a computer by installing a hardware card 600 and associated driver on the computer 110. An iSCSI (Internet Small Computer System Interface) based hardware card 600 is used. The card 600 plugs into the PCI (Peripheral Component Interconnection) bus or equivalent type of bus and it appears to the operating system 134 as a SCSI drive attached to the system 100. The hardware card 600 has a processor 602 that is operating with an iSCSI protocol stack, IPSEC, and may support TCP offload. The processor 602 has ROM 604 and RAM 606 and caches data autonomously or as instructed by the operating system 134 in NV memory 200. ROM 604 is optional and it allows the BIOS setup to provide a means to configure the card 600 to connect to a hard drive 141. The BIOS setup can also be used to boot the computer from a remote storage volume (e.g., networked disks) using a protocol such as iSCSI if the computer is connected to a network 612 that utilizes remote storage volumes. The processor may implement a storage block level network protocol stack to communicate with remote storage volumes connected to the network 612. Network interface 610 may be an Ethernet adapter. The processing unit 120 communicates with processor 602 through IOCTLs (system-dependent device input/output control commands) through interface 614 or other type of interface to provide the processing unit 120 with a way to inform the processor 602 which data blocks to cache in NV memory 608. Interface 616 is optional and could be removed if the optional ROM 604 provides a means for the BIOS to boot from card 600 in conjunction with hard drive 141. While FIG. 7 shows a network adapter card, it is recognized that other types of cards may be used, including a card that just has the NV memory and processor.

Figure 8:
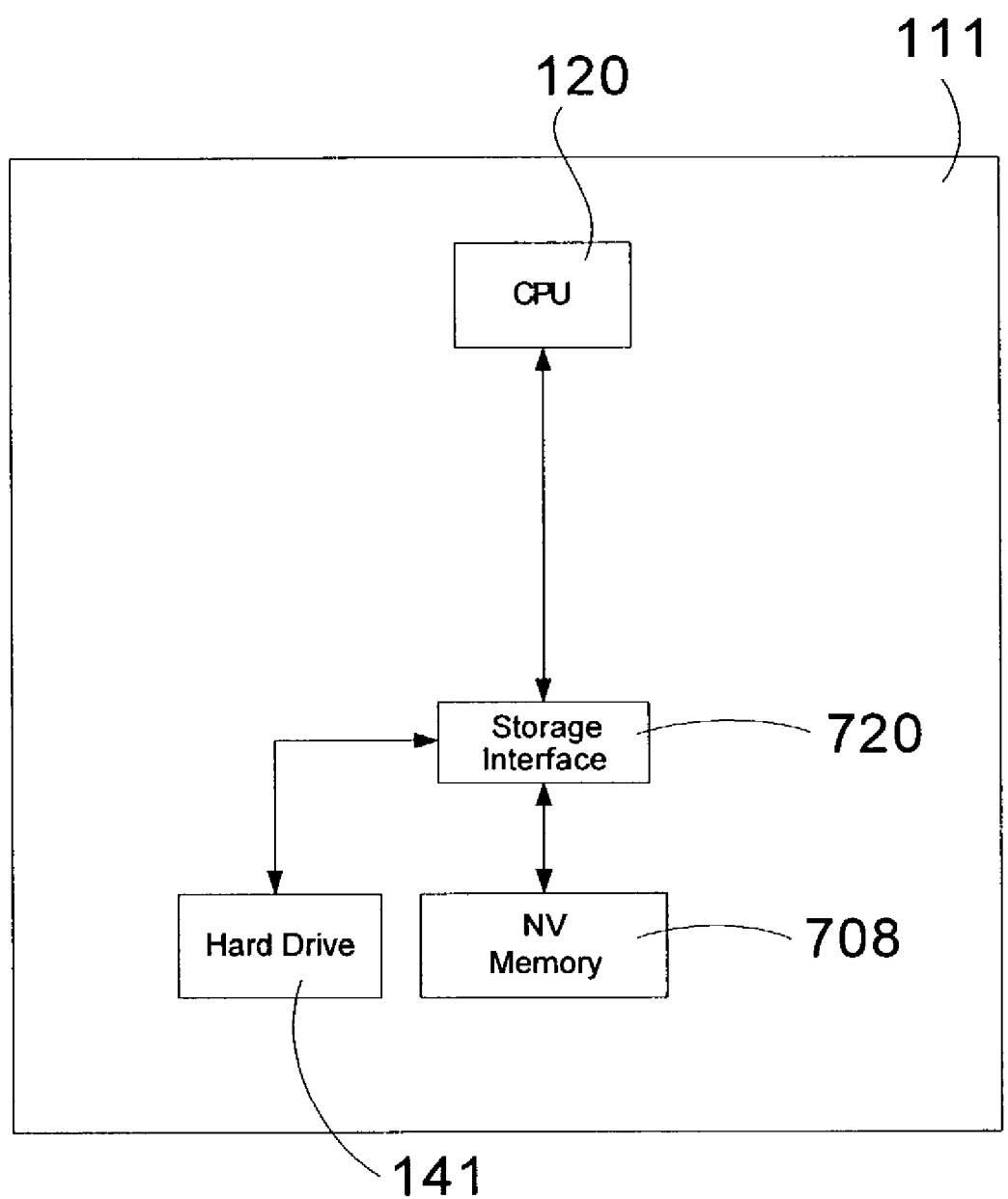
FIG. 8 is a block diagram illustrating an alternate implementation of the alternate embodiment of the invention implemented in a motherboard.

Turning now to FIG. 8, an alternate implementation of the alternate embodiment is shown. The NV memory 708 is located on the computer motherboard 111. In this implementation, the processing unit 120 caches data blocks in NV memory 708. The NV memory 708 may be exposed to the processing unit 120 as a disk or as a native device type. If exposed as a native device type, the processing unit 120 enumerates it and uses it as a resource. If exposed as a disk, the processing unit 120 caches data blocks in NV memory 708 via interface 720. Interface 720 may be an IDE/ATA protocol, a SCSI protocol, an iSCSI protocol, a NV memory cache driver and the like. The processing unit 120 may also communicate with hard drive 141 via interface 720 (or interface 140). Those skilled in the art will recognize that embodiments other than those shown in FIGS. 7 and 8 may be used in systems where the hard drive does not have NV memory that can be used by the operating system.

Turning now to FIG. 9, the storage driver stack 800 is shown. In the description that follows, the hard drive 141 and NV memory 200 are shown separately for the purpose of explanation. It is recognized that the NV memory 200 may be part of the hard drive as illustrated in the hard drive 300 of FIG. 3. The operating system 134, application programs 135, other program modules 136 send data (e.g., documents, spreadsheets, files, graphics and the like) to the storage driver stack 800. The predictive cache control module 802 controls what is in the volatile memory 132 and hard drive 141 and NV memory 200. The file system filter driver 804 receives data from the predictive cache control module 802. The principal function of file system filter driver 804 is to gracefully handle errors such as when the NV memory cache 200 is full. The file system filter driver 804 passes the data through the file system (i.e., NTFS) 806, which the operating system 134 uses for storing and retrieving files from a hard disk in the hard drive 141.

The write cache filter driver 808 receives data from the file system 806 and the predictive cache control module 802. The write cache filter driver 808 sends data to be buffered in the NV memory 200 to the NVM driver 222. The NVM driver 222 detects when the NV memory 200 no longer has capacity (i.e., it is full) and sends a message to file system filter driver 804 to indicate the NV memory 200 is full. In response, the file system filter driver 804 informs the predictive cache control module 802 to stop sending data to the NV memory 200 until the NV memory 200 has storage capacity. Additionally, the predictive cache control module 802 may provide the NVM driver 222 a list of data block to flush from the NV memory 200 to the hard drive 141.

The write cache filter driver 808 synchronizes the NV memory 200 and hard drive 141. If data is stored in the NV memory 200 and the hard drive 141, the write cache filter driver 808 reads from the NV memory 200 when it needs to synchronize the write cache in NV memory 200 with the hard drive 141. Data is transactionally written to the NV memory 200 and from the NV memory 200 to hard drive 141. This allows the system 100 to seamlessly continue working. When a write is completed, a transaction completion message is sent to the write cache driver 808. Transaction writing allows a write to be retried if the write fails or gets interrupted (i.e., no completion message is received). If the system reboots due to a loss of power or any other reason during a transaction between the NV memory 200 to the hard drive 141, the write cache filter driver 808 synchronizes the hard drive 141 with the data stored in the NV memory 200 after the system is running again. For a system where the hard drive has NV memory, the controller in the hard drive synchronizes the data.

The storage driver 810 receives data to be sent to the hard drive 141. The storage driver 810 sends data in blocks. It may be iSCSI or equivalent. iSCSI enables block storage transfer. It is a protocol that encapsulates SCSI commands in TCP/IP enabling high performance storage area networks (SANs) over standard networking technology. The storage driver 810 converts the data into data blocks (SCSI-3 data if iSCSI is used) and sends the data blocks to the hard drive 141.

As previously indicated, the predictive cache control module 802 determines what is stored in the NV memory 200. In general, the predictive cache control module 802 looks at a user's behavior over an extended period of time and determines what programs and data the user is accessing frequently and stores the data, which includes static and dynamic configuration data in the NV memory 200. Data as used herein includes personal data files such as scheduled tasks, financial information, data files, and the like. The module 802 starts with defaults until the behavior of a user can be predicted. The static and dynamic configuration data is based on a history of prior use and comprises data that is frequently required by the user. The static configuration data is data that does not change periodically. The dynamic configuration data is data that changes periodically and is on a per-user basis. The configuration data may include keyboard devices, pointing devices, the USB subsystem, the video subsystem, output peripheral drivers (e.g., printer driver) the operating system, application programs, data files and the like.

The NVM driver 812 and storage driver 810 are combined into a single module 900 in the in the case where the NV memory 200 is in hard drive 300 (see FIG. 10). The hard drive driver 900 communicates with the hard drive 300 to determine the disk's capabilities and the disk's state, to specify which blocks to place in NV memory and the priority of those blocks, which blocks to preserve indefinitely in NV memory, when to flush the NV memory 200 to disk 304, and when to commit a block of write operations to the disk 304. This improves performance for the user by having blocks in NV memory 200 that can be quickly loaded into system memory. For example, the operating system 134 could request that the hard drive 300 places in NV memory 200 the files that the operating system 134 needs to boot the computer 110. The next time the computer system is powered up, after BIOS POST (power on self test) finishes, the operating system 134 can boot from NV memory 200 without waiting for the disk 304 to spin up. If the NV memory 200 is located on the motherboard, the BIOS is modified so that it first looks to the NV memory 200 instead of hard drive 141 to load boot files (and files used to resume operation from the hibernate mode). The NV memory cache 200 may contain data that the user has identified via an interface to keep instantly available, such as the user's Contacts list in Microsoft Outlook®. The user could power on his or her computer, retrieve contact information, and power off again in the time it would take to boot a computer that doesn't have NV memory used as a storage medium.

The NV memory cache 200 consists of an array of cached memory blocks (e.g., an array of cached disk blocks, pages, sectors, files, and the like) with each block capable of being pinned. In one embodiment, each block has a tag and a pin bit associated with it to indicate whether the block is pinned. Non-pinned blocks contains data that can be prioritized by the operating system 134 but are otherwise in control of the disk controller 310. The pinned blocks are blocks in the array that are controlled by the operating system 134 and cannot be moved out of NV memory by the controller 310 unless the operating system 134 gives permission to move a pinned block out of NV memory. Data in a pinned block persists in NV memory until the operating system unpins it. The memory may be pinned in such a way that it persists between boots of the computer system. The data in pinned blocks typically includes static configuration data and dynamic configuration data.

The hard disk 300 reports its NVM capabilities and the current state of the spinning media to the operating system 134. The capabilities and current state includes information such as size of the NV memory cache 200, features supported by the NV memory (e.g., whether or not it can "pin" blocks), and the state of the disk 304 (e.g., stopped, spinning, spinning-up, or spinning-down).

The operating system 134 communicates with the hard disk controller 300 to provide information and commands to the controller 310. The information includes a list of blocks to pin in the NV memory 200 such that they persist in the cache between boots, a list of blocks to "pre-cache" in the NV memory 200 while the user is working, and the list contains the priority of pre-caching the blocks. The operating system predicts the next set of blocks that will be write-accessed, based on usage scenarios and provides a list of the next set of blocks to the NV memory 200 for pre-caching. The priority of pre-caching the blocks includes whether the pre-caching should be done immediately, including spinning up the disk 304 if necessary, or can be done the next time the disk 304 is spinning.

The information also includes a list of blocks to flush from the NV memory 200 to disk 304, an instruction to flush all of the NV memory 200 to disk 304, an instruction to flush the pinned blocks in NV memory 200 to disk 304, an instruction to flush the dynamic (i.e., non-pinned) blocks in NV memory 200 to disk 304, a designation of a set of blocks or segments that represent a write transaction (these blocks are written to a temporary location in NV memory and not stored permanently until a commit command is received from the operating system 134), and an instruction to commit the last write transaction to permanent storage in NV memory 200.

Turning now to FIG. 11, during operation, the operating system 134 uses commands to determine the size of the NV memory cache 200, features supported by the NV memory and the state of the disk (step 1000). If the hard drive 300 has NV memory, the operating system 134 changes operation modes based on the size of NV memory. If the size is sufficient to boot from the NV memory without having to use the disk 304, the operating system commands the hard drive to move the required files to boot to the NV memory prior to shutting down the system or before entering hibernation (step 1002). In addition to boot files, the operating system 134 determines via the predictive cache control module the data the user typically uses at start-up and commands the hard drive to move those files to NV memory if there is sufficient available space in the NV memory prior to shutting down or entering hibernation. If the hard drive has the capability to pin blocks into NV memory, the operating system 134 determines what should be pinned in NV memory and sends the hard drive the list of blocks that should be pinned (step 1004). The operating system 134 may periodically send this list to the controller 310 as conditions change. For example, if the user hasn't used a particular program recently that was heavily used in the past, the program is moved off the list and the program is no longer pinned in memory.

The predictive cache module 802 predicts what data the user will need based on usage scenarios (step 1006). A list of data is sent to the hard drive 300 (step 1008). These data are cached in NV memory in accordance with the priority set by the operating system 134 based upon what the user is doing. For example, if a user has started a particular application, such as Microsoft Word®, the list provided to the controller 310 contains a list of files that will be needed soon.

The available space of the NV memory 200 is monitored. When the available space falls below a threshold, the NV memory is flushed (step 1010). The operating system 134 may instruct the controller 300 to flush all data in NV memory 200 to disk 304, flush pinned blocks to disk 304, flush dynamic blocks to disk 304, or a combination of the above. The operating system 134 also sends flush commands when usage changes. The flushing can be done in the background at a time when the disk 304 is already spinning to handle a read that isn't in the NV memory 200 or the disk 304 can be spun up to do it.

When an application sends data to be stored in the hard drive 300, the operating system commands the controller 310 to store the data in data blocks in a temporary location in NV memory 300 (step 1012). These data blocks represent a write transaction. The storage of data in NV memory 200 is done to reduce the number of times the hard drive is spun up, which results in reduced power consumption. Additionally, the predictive cache module 800 may indicate that this data may be used soon based on usage scenarios. The data blocks are stored in NV memory until the operating system 134 sends an instruction to commit the write transaction to permanent storage in the disk 304. The temporary storage of data allows the operating system to operate in block storage mode and manage the storage of data blocks in accordance with operating system needs. Data to be sent to the operating system that has not been cached in NV memory is sent to the operating system directly from the disk drive.

It can be seen that a method and apparatus to reduce power consumption in a hard drive has been provided by reducing the number of times the disk in the hard drive spins. Additionally, the pre-caching of data in NV memory enhances a user's experience. The data that is stored in NV memory appears almost instantly to the user when compared to loading data from a rotating disk.

In view of the many possible embodiments to which the principles of this invention may be applied, it should be recognized that the embodiment described herein with respect to the drawing figures is meant to be illustrative only and should not be taken as limiting the scope of invention. For example, those of skill in the art will recognize that the elements of the illustrated embodiment shown in software may be implemented in hardware and vice versa or that the illustrated embodiment can be modified in arrangement and detail without departing from the spirit of the invention. Additionally, the steps described above can be performed sequentially, in parallel, in a different order, or a combination of sequential and parallel. Therefore, the invention as described herein contemplates all such embodiments as may come within the scope of the following claims and equivalents thereof.

We claim:

1. A method for operating a persistent storage device having solid state, non-volatile ("NV") memory and a disk drive, the method comprising the steps of: loading at least one block of data in NV memory from the disk drive in response to receiving a list of data to be pre-cached; and flushing the at least one block of data in response to receiving a flush command.

2. The method of claim 1 wherein the step of loading the at least one block of data in NV memory includes the step of pinning a block of data in the NV memory.

3. The method of claim 1 wherein the step of loading the at least one block of data in NV memory includes the step of immediately spinning up the disk drive.

4. The method of claim 1 wherein the NV memory has pinned data blocks and the step of flushing the at least one block of data in response to receiving a flush command comprises the step of flushing pinned data blocks in response to receiving a command to flush pinned data blocks.

5. The method of claim 1 wherein the NV memory has non-pinned data blocks and the step of flushing the at least one block of data in response to receiving a flush command comprises the step of flushing non-pinned data blocks in response to receiving a command to flush a dynamic cache.

6. The method of claim 1 wherein the NV memory has at least one pinned data block and at least one non-pinned data block and the step of flushing the at least one block of data in response to receiving a flush command comprises the step of flushing the at least one pinned data block and the at least one non-pinned data block in response to receiving a command to flush all data blocks.

7. The method of claim 1 further comprising the step of providing capabilities to the computer system in response to receiving a request to provide capabilities.

8. The method of claim 1 wherein the persistent storage device is in a computing device having a motherboard, the NV memory is located on the motherboard, and the step of loading at least one block of data in NV memory from the disk drive in response to receiving a list of data to be pre-cached includes the step of transferring the at least one block of data to the NV memory on the motherboard from the disk drive.

9. The method of claim 1 wherein the persistent storage device is in a computing device having an iSCSI board, the NV memory is located on the iSCSI board, and the step of loading at least one block of data in NV memory from the disk drive in response to receiving a list of data to be pre-cached includes the step of transferring the at least one block of data to the NV memory on the iSCSI board from the disk drive.

10. A computer-storage medium having computer executable instructions for operating a persistent storage device having solid state, non-volatile ("NV") memory and a disk drive, the computer executable instructions for performing the steps of claim 1.

11. The computer-storage medium of claim 10 wherein the step of loading at least one block of data in NV memory includes the step of pinning a block of data in the NV memory.

12. The computer-storage medium of claim 10 wherein the step of loading at least one block of data in NV memory includes the step of immediately spinning up the disk drive.

13. The computer-storage medium of claim 10 wherein the NV memory has a static section for pinned data blocks and a dynamic section for non-pinned data blocks and the step of flushing the at least one block of data in response to receiving a flush command comprises the step of flushing pinned data blocks in response to receiving a command to flush pinned data blocks.

14. The computer-storage medium of claim 10 wherein the NV memory has a static section for pinned data blocks and a dynamic section for non-pinned data blocks and the step of flushing the at least one block of data in response to receiving a flush command comprises the step of flushing non-pinned data blocks in response to receiving a command to flush a dynamic cache.

15. The computer-storage medium of claim 10 wherein the NV memory has a static section for pinned data blocks and a dynamic section for non-pinned data blocks and the step of flushing the at least one block of data in response to receiving a flush command comprises the step of flushing pinned data blocks and non-pinned data blocks in response to receiving a command to flush all data blocks.

16. The computer-storage medium of claim 10 further comprising the step of providing capabilities to the computer system in response to receiving a request to provide capabilities.

17. A method for operating a computer system having a persistent storage device having a disk drive and solid state, non-volatile ("NV) memory, the method comprising the steps of: determining capabilities of the persistent storage device; providing a list of blocks to pin in the NV memory to the persistent storage device if the persistent storage device has the ability to pin blocks; and providing a list of blocks to cache in the NV memory to the persistent storage device.

18. The method of claim 17 wherein the step of determining the capabilities of the persistent device comprises the steps of: determining a size of the NV memory; determining features supported by the NV memory; and determining a state of the disk drive.

19. The method of claim 17 further comprising the step of predicting a next set of blocks that will be accessed by a user.

20. The method of claim 19 further comprising the steps of providing a list of the next set of blocks that will be accessed by the user to the persistent storage device and commanding the persistent storage device to cache the list of the next set of blocks.

21. The method of claim 17 further comprising the step of commanding the persistent storage device to flush blocks listed in a flush list from NV memory to the disk drive.

22. The method of claim 21 wherein the step of commanding the persistent storage device to flush blocks listed in a flush list comprises the step of commanding the persistent storage device to flush all blocks in NV memory to the disk drive.

23. The method of claim 21 wherein the step of commanding the persistent storage device to flush blocks listed in a flush list comprises the step of commanding the persistent storage device to flush all pinned blocks in NV memory to the disk drive.

24. The method of claim 21 wherein the step of commanding the persistent storage device to flush blocks listed in a flush list comprises the step of commanding the persistent storage device to flush all non-pinned blocks in NV memory to the disk drive.

25. The method of claim 17 further comprising the step of commanding the persistent storage device to store a set of blocks in NV memory, the set of blocks forming a write transaction.

26. The method of claim 25 further comprising the step of commanding the persistent storage device to commit the write transaction to the disk drive.

27. A computer-storage medium having computer executable instructions for operating a computer system having a persistent storage device having NV memory and a disk drive, the computer executable instructions for performing the steps of claim 17.

28. The computer-storage medium of claim 27 having further computer-executable instructions for performing the step of predicting a next set of blocks that will be accessed by a user.

29. The computer-storage medium of claim 28 having further computer-executable instructions for performing the steps of providing a list of the next set of blocks that will be accessed by the user to the persistent storage device and commanding the persistent storage device to cache the list of the next set of blocks.

30. The computer-storage medium of claim 27 having further computer-executable instructions for performing the step of commanding the persistent storage device to flush blocks listed in a flush list from NV memory to the disk drive.

31. The computer-storage medium of claim 30 wherein the step of commanding the persistent storage device to flush blocks listed in a flush list comprises one of commanding the persistent storage device to flush all blocks in NV memory to the disk drive, commanding the persistent storage device to flush all pinned blocks in NV memory to the disk drive, and commanding the persistent storage device to flush all non-pinned blocks in NV memory to the disk drive.

32. The computer-storage medium of claim 27 having further computer-executable instructions for performing the step of commanding the persistent storage device to store a set of blocks in NV memory, the set of blocks forming a write transaction.

33. The computer-storage medium of claim 32 having further computer-executable instructions for performing the step of commanding the persistent storage device to commit the write transaction to the disk drive.

34. An interface for enabling an operating system to control a solid state, non-volatile ("NV") memory cache in a hard drive, the interface comprising: a first command to determine capabilities of the hard drive; a second command to pin a list of blocks in the NV memory; a third command to pre-cache a list of blocks in the NV memory; and a fourth command to flush commands from the NV memory to a hard drive disk.

35. The interface of claim 34 further comprising a fifth command to write a set of blocks that comprise a write transaction to NV memory.

36. The interface of claim 35 further comprising a sixth command to commit the write transaction to the hard drive disk.

37. The interface of claim 34 wherein the fourth command to flush commands from the NV memory to the hard drive disk comprises an instruction to flush a list of blocks from the NV memory to the hard drive disk.

38. The interface of claim 34 wherein the fourth command to flush commands from the NV memory to the hard drive disk comprises an instruction to flush all blocks in the NV memory from the NV memory to the hard drive disk.

39. The interface of claim 34 wherein the fourth command to flush commands from the NV memory to the hard drive disk comprises an instruction to flush pinned blocks from the NV memory to the hard drive disk.

40. The interface of claim 34 wherein the fourth command to flush commands from the NV memory to the hard drive disk comprises an instruction to flush a non-pinned blocks from the NV memory to the hard drive disk.

41. A method for operating a persistent storage device having solid state, non-volatile ("NV") memory and a disk drive in a computing device, the method comprising the steps of: storing data received from the computing device in data blocks in NV memory; determining when the NV memory available space is below a threshold; flushing at least a portion of the NV memory to the disk drive if the NV memory available space is below the threshold; and sending data stored on the disk drive that is requested by the computing device directly to the computing device.

42. The method of claim 41 wherein the step of flushing the at least a portion of the NV memory to the disk drive comprises the steps of immediately spinning up the disk drive and flushing the at least a portion of the NV memory to the disk drive.

43. The method of claim 41 wherein the step of flushing the at least a portion of the NV memory to the disk drive comprises the steps of waiting until the disk drive is spinning for data to be sent to the computing device and flushing the at least a portion of the NV memory to the disk drive after the disk drive has spun up.

44. A persistent storage device comprising: a disk drive; an array of solid state, non-volatile ("NV") memory blocks in communication with the disk drive and a controller, the controller in communication with the disk drive, the controller for controlling the disk drive and the NV memory and adapted to store at least one data block received from a computing device in at least one memory block in NV memory and flush the at least one block of data in response to receiving a flush command.

45. The persistent storage device of claim 44 wherein the controller is further adapted to load at least one block of data in NV memory from the disk drive in response to receiving a list of data to be pre-cached.

46. The persistent storage device of claim 44 wherein the controller is further adapted to pin a block of data in the NV memory.

47. The persistent storage device of claim 44 wherein the controller is further adapted to immediately spin up the disk drive to load the at least one block of data in NV memory.

48. The persistent storage device of claim 44 wherein each memory block is one of a pinned data block and a non-pinned data block and the controller is further adapted to flush pinned data blocks in response to receiving a command to flush pinned data blocks.

49. The persistent storage device of claim 44 wherein each memory block is one of a pinned data block and a non-pinned data block and the controller is further adapted to flush non-pinned data blocks in response to receiving a command to flush a dynamic cache.

50. The persistent storage device of claim 44 wherein the NV memory comprises an array of memory blocks, each memory block being one of a pinned data block and a non-pinned data block and the controller is further adapted to flush pinned data blocks and non-pinned data blocks in response to receiving a command to flush all data blocks.

51. The persistent storage device of claim 44 wherein the controller is further adapted to provide capabilities to the computer system in response to receiving a request to provide capabilities.

52. The persistent storage device of claim 51 wherein the controller provides a size of the NV memory, features supported by the NV memory, and the state of the disk drive when the controller provides capabilities to the computer system.

53. The persistent storage device of claim 44 wherein the controller is further adapted to: determine when the NV memory available space is below a threshold; and flush at least a portion of the NV memory to the disk drive if the NV memory available space is below the threshold.

54. The persistent storage device of claim 44 wherein the controller is further adapted to send data stored on the disk drive that is requested by a computing device directly to the computing device.

* * * * *

UNITED STATES PATENT AND TRADEMARK OFFICE
CERTIFICATE OF CORRECTION

| | | |
|---|---|---|
| PATENT NO. | : 7,082,495 B2 | Page 1 of 1 |
| APPLICATION NO. | : 10/372734 | |
| DATED | : July 25, 2006 | |
| INVENTOR(S) | : Dean L. Dewhitt et al. | |

It is certified that error appears in the above-identified patent and that said Letters Patent is hereby corrected as shown below:

In the Abstract, at page 1, lines 10-11, please delete "temporary" and insert --temporarily--.

In Claim 27, lines 1-2, please delete "computer executable," and insert --computer-executable--.

Signed and Sealed this

Ninth Day of January, 2007

JON W. DUDAS
*Director of the United States Patent and Trademark Office*